(12) United States Patent
Gindele et al.

(10) Patent No.: US 6,931,160 B2
(45) Date of Patent: *Aug. 16, 2005

(54) METHOD OF SPATIALLY FILTERING DIGITAL IMAGE FOR NOISE REMOVAL, NOISE ESTIMATION OR DIGITAL IMAGE ENHANCEMENT

(75) Inventors: Edward B. Gindele, Rochester, NY (US); Navid Serrano, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 649 days.

This patent is subject to a terminal disclaimer.

(21) Appl. No.: 09/998,874

(22) Filed: Oct. 31, 2001

(65) Prior Publication Data

US 2003/0095716 A1 May 22, 2003

(51) Int. Cl.[7] ................................................. G06K 9/40
(52) U.S. Cl. ...................................... 382/261; 382/275
(58) Field of Search .......................... 382/754, 260–264, 382/275, 266, 272, 172, 168, 205, 132, 199

(56) References Cited

U.S. PATENT DOCUMENTS

| 5,081,692 | A | | 1/1992 | Kwon et al. | |
| 5,594,816 | A | * | 1/1997 | Kaplan et al. | 382/275 |
| 5,671,264 | A | * | 9/1997 | Florent et al. | 378/98 |
| 5,809,178 | A | | 9/1998 | Anderson et al. | |
| 5,923,775 | A | | 7/1999 | Snyder et al. | |
| 6,118,906 | A | | 9/2000 | Keyes et al. | |
| 6,681,054 | B1 | * | 1/2004 | Gindele | 382/272 |
| 6,718,068 | B1 | * | 4/2004 | Gindele et al. | 382/254 |
| 6,731,806 | B1 | * | 5/2004 | Gindele | 382/205 |

OTHER PUBLICATIONS

Lee, Digital Image Smoothing and the Sigma Filter, Computer Vision, Graphics, and Image Processing 24, 255–269, (1983).

* cited by examiner

*Primary Examiner*—Amelia M. Au
*Assistant Examiner*—Wes Tucker
(74) *Attorney, Agent, or Firm*—Raymond L. Owens

(57) ABSTRACT

A method of spatially filtering a digital image includes receiving a source digital image including pixels corresponding to one or more different colors; selecting a pixel of interest in the source digital image; calculating two or more noise free pixel estimates for the pixel of interest using pixel values sampled in a local region about the pixel of interest; selecting a final noise free pixel estimate for the pixel of interest from the noise free pixel estimates; and repeating for other pixels in the source digital image to provide a spatially filtered digital image.

20 Claims, 4 Drawing Sheets

METHOD OF SPATIALLY FILTERING DIGITAL IMAGE FOR NOISE REMOVAL, NOISE ESTIMATION OR DIGITAL IMAGE ENHANCEMENT

FIELD OF INVENTION

The present invention relates to spatially filtering digital images for noise removal, noise estimation or digital image enhancement.

BACKGROUND OF THE INVENTION

Some digital image processing applications designed to enhance the appearance of digital images take explicit advantage of the noise characteristics associated with the source digital images. For example, Keyes et al. in commonly-assigned U.S. Pat. No. 6,118,906 describe a method of sharpening digital images which includes the steps of measuring the noise components in the digital image with a noise estimation system to generate noise estimates and sharpening the digital image with an image sharpening system which uses the noise estimates. Similarly, digital imaging applications have incorporated automatic noise estimation methods for the purpose of reducing the noise in the processed digital images as in the method described by Anderson et al. in U.S. Pat. No. 5,809,178.

In commonly-assigned U.S. Pat. No. 5,923,775, Snyder et al. disclose a method of image processing which includes a step of estimating the noise characteristics of a digital image and using the estimates of the noise characteristics in conjunction with a noise removal system to reduce the amount of noise in the digital image. The method described by Snyder et al. is designed to work for individual digital images and includes a multiple step process for the noise characteristics estimation procedure. A first residual signal is formed from the digital image obtained by applying a spatial filter. This first residual is analyzed to form a mask signal which determines what regions of the digital image are more and less likely to contain image structure content. The last step includes forming a second residual signal and sampling the second residual signal in the image regions unlikely to contain image structure as indicated by the first residual signal. The method taught by Snyder et al. requires the use of the mask signal to produce accurate noise estimates due to the fact that the spatial filter used to calculate the second residual image does not fully filter the image structure content.

It is desirable in any noise estimation method to obtain a residual signal that is pure noise, with no image structure content. This will lead to more accurate estimation of the noise characteristics in the image. Existing techniques suffer from the problem of image structure contamination in the residual signal used to estimate the noise. In other words, the spatial filter that produces the residual signal does not fully filter out image structure. The masking technique can not fully exclude image structure pixels from the residual signal.

SUMMARY OF THE INVENTION

It is an object of the present invention to provide a spatial filtering method that yields a residual signal with reduced image structure.

It is a further object of the present invention to provide a method of spatial filtering which is particularly suitable for noise removal, noise estimation or digital image enhancement.

These objects are achieved by a method of spatially filtering a digital image comprising the steps of:

a) receiving a source digital image including pixels corresponding to one or more different colors;

b) selecting a pixel of interest in the source digital image;

c) calculating two or more noise free pixel estimates for the pixel of interest using pixel values sampled in a local region about the pixel of interest;

d) selecting a final noise free pixel estimate for the pixel of interest from the noise free pixel estimates; and e) repeating steps b) through e) for other pixels in the source digital image to provide a spatially filtered digital image.

It is an advantage of the present invention that by using the spatial filtering technique accurate estimates of the noise present in digital images can be produced. It is a further advantage of the present invention that the spatial filtering technique can also produce processed digital images with noise removed.

DETAILED DESCRIPTION OF THE INVENTION

In the following description, a preferred embodiment of the present invention will be described as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein can be selected from such systems, algorithms, components, and elements known in the art. Given the description as set forth in the following specification, all software implementation thereof is conventional and within the ordinary skill in such arts.

Figure 1:
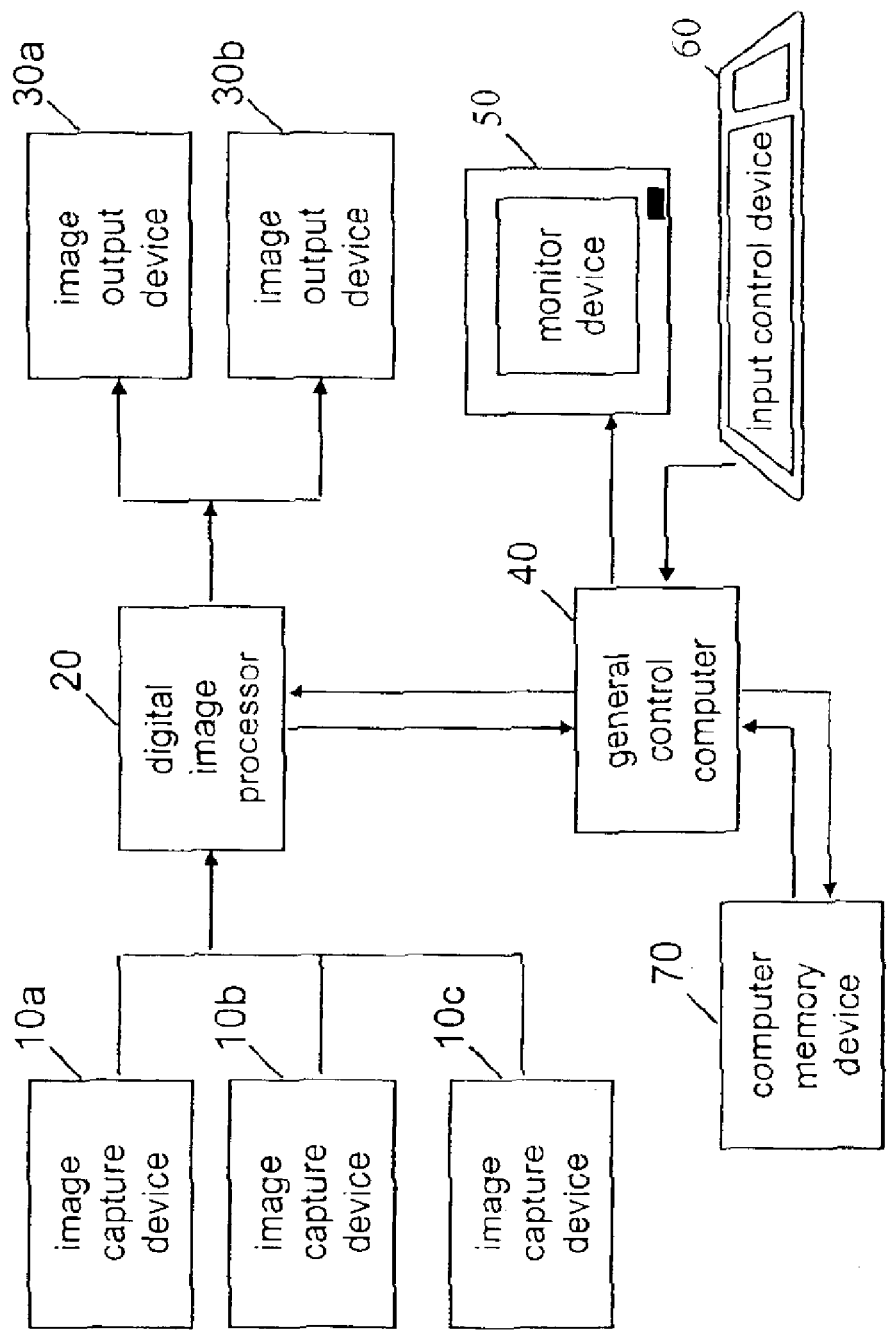
FIG. 1 is a functional block diagram of the operation of a processing arrangement for practicing the present invention.

The present invention can be implemented in computer hardware. Referring to FIG. 1, the following description relates to a digital imaging system which includes an image capture device 10*a,* an digital image processor 20, an image output device 30*a*, and a general control computer 40. The system can include a monitor device 50 such as a computer console or paper printer. The system can also include an input device control 60 for an operator such as a keyboard and or mouse pointer. Multiple capture devices 10*a*, 10*b*, and 10*c* are shown illustrating that the present invention can be used for digital images derived from a variety of imaging devices. For example, FIG. 1 can represent a digital photofinishing system where the image capture device 10*a* is a conventional photographic film camera for capturing a scene on color negative or reversal film, and a film scanner device for sensing the developed image on the film and producing a digital image. Although the term "scanner" can refer to digital imaging devices that physically scan or move a sensing element past a photographic film sample, the present invention also includes photographic film scanners and print scanners that employ a stationary image sensing device to generate a digital image. The digital image processor 20 provides the means for processing the digital images to produce pleasing looking images on the intended output device or media. Multiple image output devices 30a and 30b are shown illustrating that the present invention can be used in conjunction with a variety of output devices which can include a digital photographic printer and soft copy display. The digital image processor 20 processes the digital image to adjust the overall brightness, tone scale, image structure etc. of the digital image in a manner such that a pleasing looking image is produced by an image output device 30a. Those skilled in the art will recognize that the present invention is not limited to just these mentioned image processing modules.

The general control computer 40 shown in FIG. 1 can store the present invention as a computer program stored in a computer readable storage medium, which can include, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention can also be stored on any other physical device or medium employed to store a computer program indicated by offline memory device 70. Before describing the present invention, it facilitates understanding to note that the present invention is preferably utilized on any well-known computer system, such as a personal computer.

It should also be noted that the present invention implemented in a combination of software and/or hardware is not limited to devices which are physically connected and/or located within the same physical location. One or more of the devices illustrated in FIG. 1 can be located remotely and can be connected via a wireless connection.

A digital image includes one or more digital image channels. Each digital image channel includes a two-dimensional array of pixels. Each pixel value relates to the amount of light received by the image capture device 10a corresponding to the geometrical domain of the pixel. For color imaging applications a digital image will typically consist of red, green, and blue digital image channels. Other configurations are also practiced, e.g. cyan, magenta, and yellow digital image channels. Motion imaging applications can be thought of as a time sequence of digital images. Those skilled in the art will recognize that the present invention can be applied to, but is not limited to, a digital image channel for any of the above mentioned applications. Although the present invention describes a digital image channel as a two dimensional array of pixel values arranged by rows and columns, those skilled in the art will recognize that the present invention can be applied to mosaic (non rectilinear) arrays with equal effect.

Figure 2:
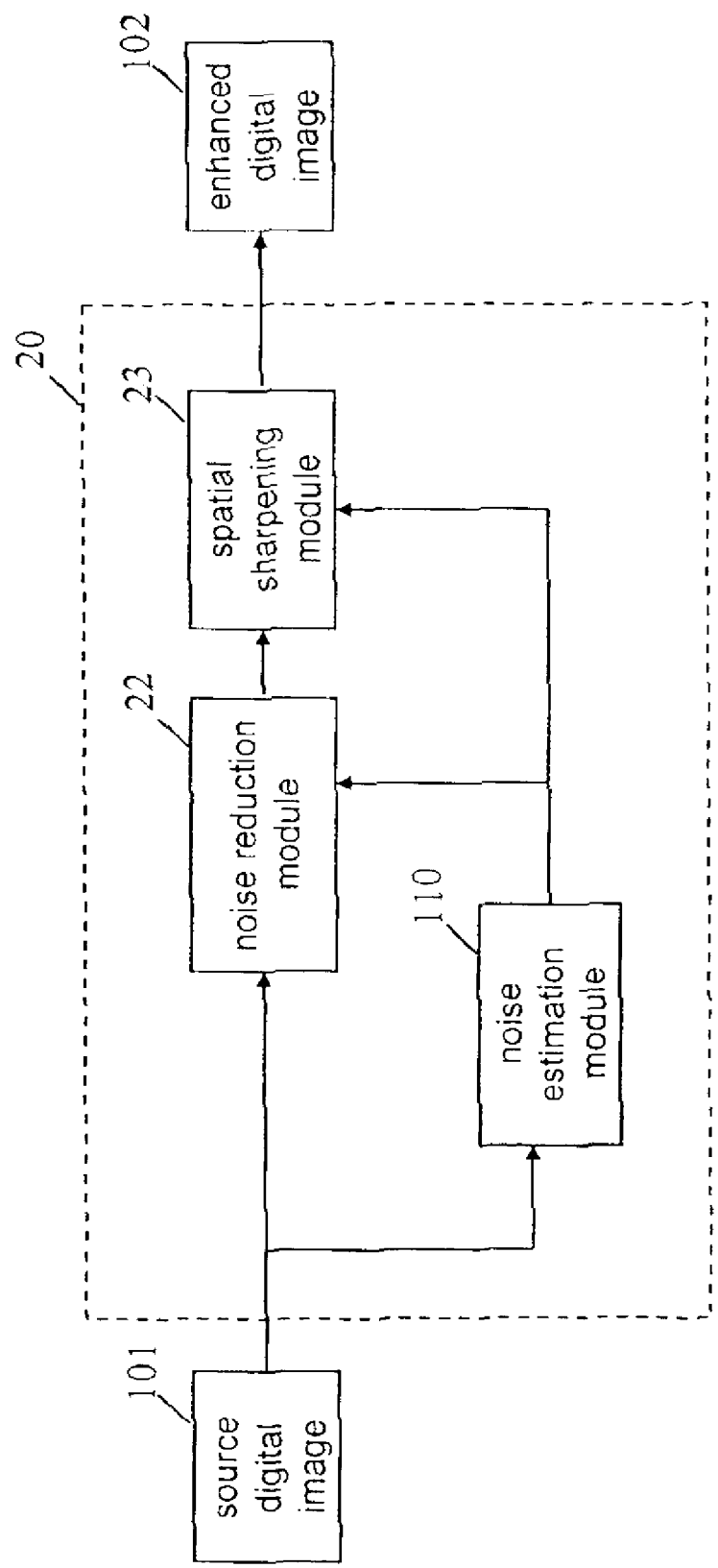
FIG. 2 is a functional block diagram of the digital image processor shown in FIG. 1.

The digital image processor 20 shown in FIG. 1 is illustrated in more detail in FIG. 2. The general form of the digital image processor 20 employed by the present invention is a cascaded chain of image processing modules. A source digital image 101 is received by the digital image processor 20 which produces on output an enhanced digital image 102 and a local noise characteristic table 105, i.e. a table of noise characteristic values. A noise estimation module 110 receives the source digital image 101 and produces the local noise characteristic table 105. Each image processing module contained within the digital image processor 20 receives a digital image, modifies the digital image, produces a processed digital image and passes the processed digital image to the next image processing module. The two enhancement transform modules shown within the digital image processor 20 are a noise reduction module 22 and a spatial sharpening module 23. These two modules use the local noise characteristic table 105 produced by the noise estimation module 110 to produce the enhanced digital image 102. Those skilled in the art will recognize that the any other image processing module that utilizes a noise characteristic table can be used with the present invention.

Figure 3:
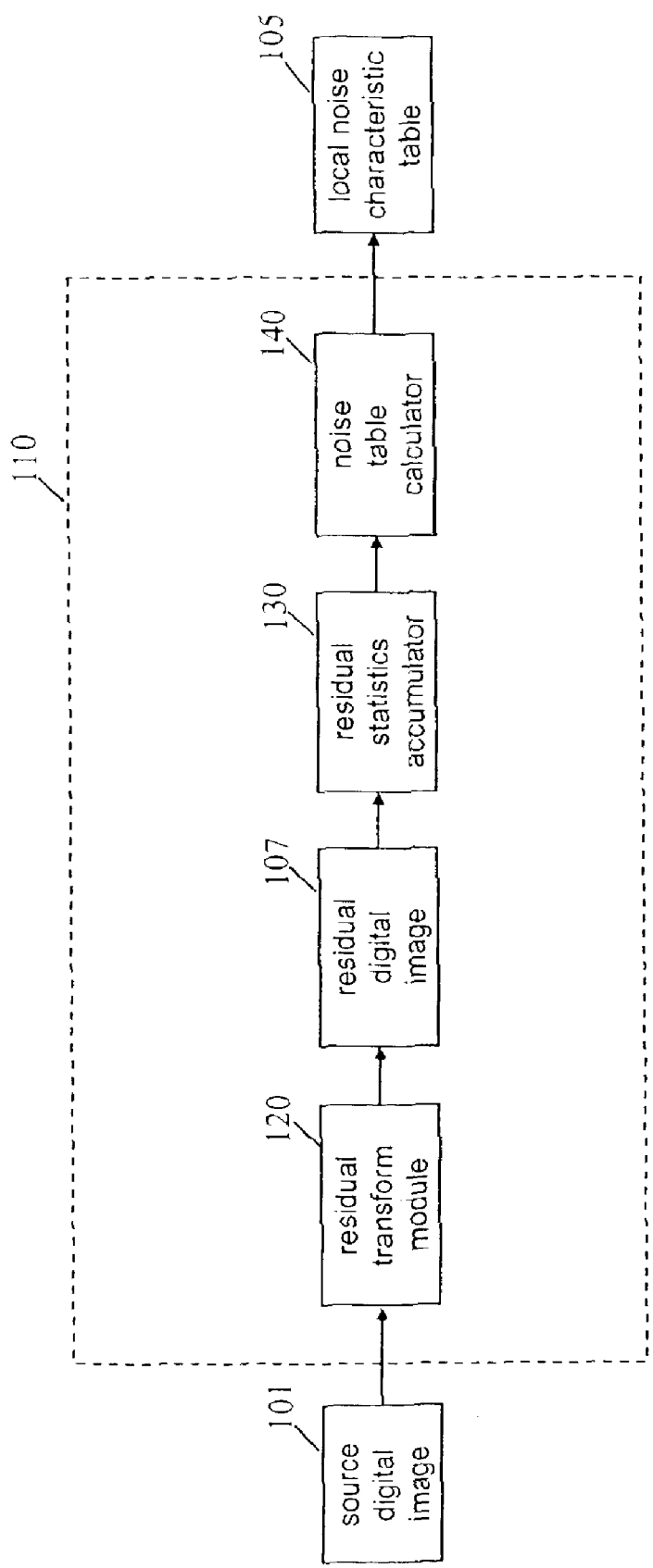
FIG. 3 is a function block diagram of the noise estimation module shown in FIG. 2.

The noise estimation module 110 shown in FIG. 2 is illustrated in more detail in FIG. 3. The source digital image 101 includes pixels corresponding to one or more different colors and typically includes three digital image channels that have pixels corresponding to red, green, and blue colors. The residual transform module 120 receives the source digital image 101 and uses a spatial filter and the pixel data of the source digital image 101 to calculate a residual digital image 107, i.e. a residual pixel value corresponding to each original pixel value in the source digital image 101. Thus the residual digital image 107 includes pixels having pixel values corresponding to the one or more different colors of the source digital image 101. A residual statistics accumulator 130 receives the residual digital image 107 and calculates a set of residual histograms from the residual digital image 107. A noise table calculator 140 receives the set of residual histograms and produces an noise characteristic table 105.

The residual transform module 120 performs a spatial filtering operation on the pixel data of the source digital image 101. That is, a residual pixel value is generated for each pixel of interest in the source digital image 101. In general, all or nearly all of the pixels of the source digital image 101 are selected as pixels of interest. However, it is important to note that the present invention can be practiced using a subset of the pixels of the source digital image 101 and still produce accurate noise characteristic tables. For each pixel of interest, a collection of pixel values sampled in a local region about the pixel of interest is used to calculate two or more noise-free pixel estimates for the pixel of interest. A final noise-free pixel estimate is chosen based on a particular criterion and is then subtracted from the original pixel of interest to obtain a residual pixel value. The residual transform module 120 performs the spatial filtering operation on each color digital image channel individually and forms a residual pixel value for each pixel of each color digital image channel. That is, the spatial filtering operation of the red pixel values does not use the green pixel values and vice versa. The process is described mathematically below.

Let g(x,y) describe the array of pixel value corresponding to a individual color digital image channel of the source digital image 101. Assuming an additive noise source, g(x,y) can be defined in terms of a noise component n(x,y) and the signal component f(x,y):

$$g(x,y) = f(x,y) + n(x,y) \qquad (1)$$

An estimate of the signal component f(x,y) is obtained using a spatial filter. The noise component n(x,y) is then obtained by computing the difference between g(x,y) and the signal component f(x,y). The effectiveness of the overall noise estimation process depends largely on the effectiveness of the spatial filter used. The better the approximation of f(x,y), the better the estimate of the noise component n(x,y). Ultimately, the goal is to produce a noise component (the residual digital image 107), n(x,y), that is composed exclusively of noise. That is, there should be no image structure signal content in the residual digital image 107.

The preferred embodiment of the present invention uses a linear spatial filter applied in four directions in a local region about the pixel of interest: at 0, 90, 45, and 135 degrees. These four directions correspond to pixels sampled about the pixel of interest along a line centered in the local region about the pixel of interest. The linear spatial filter uses a linear combination of the neighboring pixels in accordance with a cubic relationship to calculate a noise free pixel estimate. The coefficients for the cubic linear spatial filter are given below:

$$[-\tfrac{1}{6} \;\; \tfrac{2}{3} \;\; 0 \;\; \tfrac{2}{3} \;\; -\tfrac{1}{6}] \qquad (2)$$

The linear spatial filter is applied to the neighboring pixels for the four directions listed above thus producing four noise free pixel estimates for the pixel of interest. The linear spatial filter described in equation (2) has a zero coefficient for the pixel of interest. Thus the noise free pixel estimates produced with the linear spatial filter are independent from the value of the pixel of interest.

Figure 4:
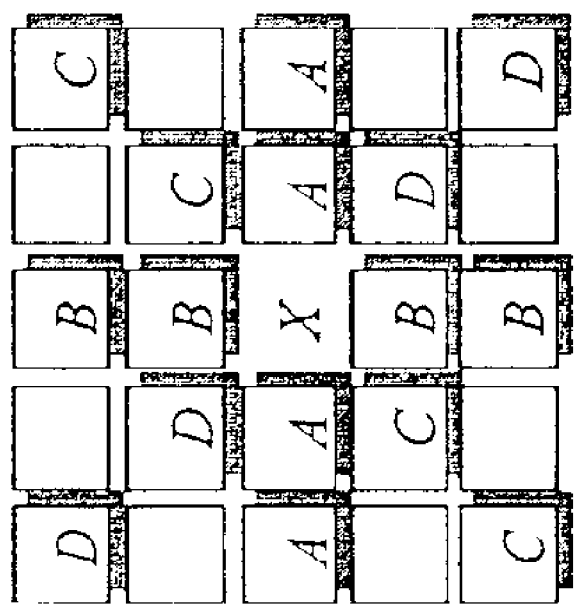
FIG. 4 is a diagram of the pixels in a local region about the pixel of interest used to calculate the noise free pixel estimate.

The final noise free pixel estimate is chosen based on the minimum absolute difference between each noise free pixel estimate and the value of the pixel of interest, i.e. the noise free pixel estimate that is closet in value. The pixels sampled in a local region about the pixel of interest used to obtain the four estimates are shown in FIG. 4. The pixels labeled A constitute the 0 degree orientation, the pixels labeled B constitute the 90 degree orientation, and the pixels labeled C and D constitute the 45 and 135 degree orientations, respectively. Each set of pixels A, B, C and D would be multiplied by the coefficients of the filter shown in equation 2.

The spatial filtering technique described above can be used for noise estimation and noise removal As described hereinbelow, the final noise free pixel estimate is subtracted from the pixel of interest to form a noise residual image from which an estimate of the noise content can be derived. The present invention also uses the spatial filtering technique to form an enhanced digital image from the final noise free pixel estimate values.

Let x represent the value of the pixel of interest and $y_i$, i=1,2, . . . ,4, be the four noise free pixel estimates obtained using the spatial filter, and $\hat{x}$ represent the final noise free pixel estimate. The final noise free pixel estimate is chosen using the following criterion:

$$\hat{x} = \min_i |x - y_i| \qquad (3)$$

It is important to note that while the present invention uses the minimum absolute difference criterion to establish which pixel estimate is closest in value to the pixel of interest, those skilled in the art will recognize that other criteria, such as the second closest numerical estimate, can be used to produce similar results.

The noise component n(x,y) is obtained by rearranging equation (1) as:

$$n(x,y)=g(x,y)-f(x,y) \qquad (4)$$

Thus the noise residual image 107 is obtained by subtracting the final noise free pixel estimates from the values of the corresponding pixels of interest.

Those skilled in the art will recognize that other spatial filters can be used. For example, a linear filter that implements a linear combination of lower degree than the aforementioned cubic approximation can also be used to obtain the noise free pixel estimates. Similarly, those skilled in the art will recognize that fewer than four and greater than four noise free pixel estimates can be used with the present invention to produce good results. For example, pixels aligned along other directions can be used other than the four directions described in the preferred embodiment. Experimentation has shown that for some types of imagery more noise free pixel estimates can have an advantage. However, for a wide range of digital images obtained in digital imaging systems the cubic approximate linear filter applied in four directions provided accurate results while not requiring excessive numerical computation.

The pixel data of the source digital image 101 can be conceptualized as having two components—a signal component relating to photographed objects f(x,y) and a noise component n(x,y). The resulting residual pixel values have statistical properties that have a closer relationship to the noise component of the pixel data of the source digital image 101 than the signal component. Although the noise component can contain sub-components, the stochastic sub-component of the noise component is well modeled by a zero mean Gaussian probability distribution function. To first order, the noise component of the pixel data of the source digital image 101 can be characterized by a standard deviation and a mean value of zero. To second order, standard deviation of the noise component can be modeled as being signal strength and color dependent.

Referring to FIG. 3, a residual statistics accumulator 130 analyzes the residual pixel values and records these values in the form of a set of residual histograms as a function of the color digital image channel and pixel value. Therefore a given residual histogram $H_{ik}$ relates to the $i^{th}$ color digital image channel and the $k^{th}$ pixel value sub-range. For each pixel of interest denoted by $P_{mn}$ (corresponding to the $m^{th}$ row and $n^{th}$ column location) in the processed color digital image channel, a histogram bin index k is computed. For example, if the numerical range of pixel values is from 0 to 255 there can be as many as 256 useful histograms, i.e. one histogram for each possible numerical pixel value. In general, most noise sources can be characterized as having noise standard deviations that are slow functions of the pixel value. Therefore, the preferred embodiment of the present invention uses 8 histograms to cover the numerical pixel value range of 0 to 255. Thus the calculated histogram index bin and the sub-range pixel values are given by the following Table (1).

TABLE (1)

| histogram bin index | sub-range pixel values | average pixel value |
|---|---|---|
| 0 | 0 to 31 | 16 |
| 1 | 32 to 63 | 48 |
| 2 | 64 to 95 | 80 |
| 3 | 96 to 127 | 112 |
| 4 | 128 to 159 | 144 |
| 5 | 160 to 191 | 176 |
| 6 | 192 to 233 | 208 |
| 7 | 234 to 255 | 240 |

Those skilled in the art will recognize that the present invention can be practiced with digital image pixel data with any numerical range. The number of residual histograms used for each color digital image channel will depend on the accuracy of results required for the particular digital imaging application.

Although each approximate residual histogram records statistical information for a range of pixel values for a given color digital image channel, the residual histogram records the frequency of residual pixel values associated with each pixel of interest $p_{mn}$. Since the expected mean of the distribution of residual pixel values is zero, the residual pixel values exhibit both positive and negative values. Therefore, the approximate residual histogram must record the frequency, i.e. the number of instances of residual pixel values, of all possible instances of residual pixel values. For the example above, the residual pixel values can range from −255 to +255. While is possible to construct local residual histograms with as many recording bins as there are possible instances of residual pixel values, in general it is not necessary. For most digital images only a small percentage of residual pixel values exhibit values near the extremes of the possible range. The present invention uses 101 total recording bins for each residual histogram. On of the recording bins corresponds to residual pixel values of 50 and greater. Similarly, one other recording bin corresponds to residual pixel values of −50 and lower. The other 99 recording bins each correspond to a single residual pixel value for the numerical range from −49 to +49.

Referring to FIG. 3, the noise table calculator 140 receives the set of residual histograms and calculates a noise characteristic table. For each of the residual histograms relating to a particular color digital image channel and pixel value range, the noise table calculator 140 derives a noise standard deviation value from the value of the recording cells of the updated residual histogram. The preferred embodiment of the present invention uses equation (5) to calculate the standard deviation value $\sigma_n$ $$\sigma_n = ((1/N)\Sigma_k RC_v(k)(x-x_m)^2)^{1/2} \qquad (5)$$

where the variable x represents the average pixel value of the residual pixel values accumulated in the $k^{th}$ recording cell as given by Table (1) and $RC_v(k)$ represents the number of residual pixel values accumulated by the $k^{th}$ recording cell.

$$x = V(k) \qquad (6)$$

The variable $x_m$ represents the arithmetic mean value of the corresponding residual pixel values given by equation (4) and, $$x_m = (1/N)\Sigma_k x \qquad (7)$$

and the variable N represents the total number of residual pixel values recorded by the updated residual histogram given by equation (8).

$$N = \Sigma_k RC_v(k) \qquad (8)$$

An alternative embodiment of the present invention performs an alpha-trimmed standard deviation calculation. In this embodiment a first approximation to the standard deviation $\sigma_e$ is calculated using the method described above. The calculation of $\sigma_n$ is then calculated using the only recording cells with corresponding residual pixel values that are within a limited range of zero. The formula for the standard deviation calculation $\sigma_n$ is given by equation (9)

$$\sigma_n = ((1/N)\Sigma_k \gamma RC_v(k)(x-x_m)^2)^{1/2} \qquad (9)$$

where the variable γ is given by equation (10)

$$\gamma = 1 \text{ if } |x| < \alpha\sigma_e \qquad (10)$$

$$\gamma = 0 \text{ if } |x| >= \alpha\sigma_e$$

where the variable α is set to 3.0. This alternative embodiment of the present invention is more computationally intensive than the preferred embodiment but does yield more accurate results via the rejection of out-lying residual pixel values from adversely contributing to the calculation of the standard deviation $\sigma_n$ value.

Table 2 below is an example of an noise characteristic table produced with the present invention.

TABLE (2)

| Average pixel value | Standard deviation of red channel | Standard deviation of green channel | Standard deviation of blue channel |
|---|---|---|---|
| 16 | 2.6 | 3.38 | 4.39 |
| 48 | 2.97 | 3.86 | 5.02 |
| 80 | 3.38 | 4.39 | 5.71 |
| 112 | 4.17 | 5.42 | 7.05 |
| 144 | 5.01 | 6.51 | 8.47 |
| 176 | 5.62 | 7.31 | 9.50 |
| 208 | 4.73 | 6.15 | 7.99 |
| 240 | 4.19 | 5.45 | 7.08 |

Those skilled in the art should recognize that the present invention can be practiced with calculated quantities other than the standard deviation that relate to the noise present in digital images. For example, the statistical variance or statistical median can also be derived from the residual histograms and be used to form a table of noise characteristic values. As can be seen from Table 2, the noise characteristic value is reported as a function of the average numerical values of the source digital image pixels—i.e. the light intensity values represented in the source digital image. In addition, if the source digital image contains two or more color channels, the noise characteristic values can also be reported as a function of these color channels (as is the case in Table 2).

The accuracy of the noise characteristic value estimates yielded by the present invention can be improved with additional refinement of the residual pixel values. For example, if the source digital image contains two or more color channels, the residual pixel values for the two or more color channels can be used to calculate a color weighting factor. This color weighting factor can then be used to exclude residual pixel values from the calculation of the noise characteristic value. Those skilled in the art will note that this type of refinement is well documented in the literature and could easily be combined with the present invention.

The present invention uses a set of residual histograms to record the calculated statistics. A set of histograms is an example of a statistical table from which a noise characteristic table can be derived. Thus the set of residual histograms constitutes a statistical table. Those skilled in the art should recognize that the present invention can be practiced with other forms of statistical tables. For example, the residual digital images can be stored and serve as a statistical table.

The calculated noise characteristic table is used in conjunction with spatial filters for the purpose of enhancing the source digital image 101 and thus produce an enhanced digital image 102. A spatial filter is any method which uses pixel values sampled from a local region about a pixel of interest to calculate an enhanced pixel value which replaces the pixel of interest. Those spatial filters which reduce spatial modulation, for at least some pixels in an effort to remove noise from the processed digital image, can be considered noise reduction filters. Those spatial filters which increase spatial modulation, for at least some pixels in an effort to enhance spatial detail noise in the processed digital image, can be considered spatial sharpening filters. It should be noted that it is possible for a single spatial filter to be considered both a noise reduction filter as well as a spatial sharpening filter. The present invention can be used with any digital image processing method which makes uses of a noise characteristic table to produce an enhanced digital image 102. Spatial filters that adjust a processing control parameter as a function of either the color or numerical value of pixels are adaptive spatial filters. The present invention uses a noise reduction filter and a spatial sharpening filter which are responsive to a noise characteristic table.

Referring to FIG. 2, the preferred embodiment of the present invention employs a noise reduction module 22 as part of the image processing method to produce enhanced digital images 102. As such, the source digital image 101 and the noise characteristic table 105 are received by the noise reduction module 22 which produces on output a noise reduced digital image.

It is important to note that for many practical digital imaging image systems, other image processing processors need to be included. As long as these other image processing processors accept a digital image as input and produce a digital image on output, more of these type of image processing modules can be inserted in the image processing chain in between a noise reduction module 22 and a spatial sharpening module 23.

The present invention uses a modified implementation of the Sigma filter, described by Jong-Sen Lee in the journal article *Digital Image Smoothing and the Sigma Filter,* Computer Vision, Graphics, and Image Processing Vol 24, p. 255–269, 1983, as a noise reduction filter to enhance the appearance of the processed digital image. The values of the pixels contained in a sampled local region, n by n pixels where n denotes the length of pixels in either the row or column direction, are compared with the value of the center pixel, or pixel of interest. Each pixel in the sampled local region is given a weighting factor of one or zero based on the absolute difference between the value of the pixel of interest and the local region pixel value. If the absolute value of the pixel value difference is less or equal to a threshold $\epsilon$, the weighting factor if set to one. Otherwise, the weighting factor is set to zero. The numerical constant $\epsilon$ is set to two times the expected noise standard deviation. Mathematically the expression for the calculation of the noise reduced pixel value is given as $$q_{mn} = \Sigma_{ij} a_{ij} p_{ij} / \Sigma_{ij} a_{ij} \tag{11}$$

and $$a_{ij} = 1 \text{ if } |p_{ij} - p_{mn}| <= \epsilon$$

$$a_{ij} = 0 \text{ if } |p_{ij} - p_{mn}| > \epsilon$$

where $p_{ij}$ represents the $ij^{th}$ pixel contained in the sampled local region, $p_{mn}$ represents the value of the pixel of interest located at row m and column n, $a_{ij}$ represents a weighting factor, and $q_{mn}$ represents the noise reduced pixel value. Typically, a rectangular sampling region centered about the center pixel is used with the indices i and j varied to sample the local pixel values.

The signal dependent noise feature is incorporated into the expression for $\epsilon$ given by equation (12)

$$\epsilon = Sfac \sigma_n(p_{mn}) \tag{12}$$

where $\sigma_n$ represents the noise standard deviation of the source digital image evaluated at the center pixel value $p_{mn}$ as described by equations (6) and (11) above. The parameter Sfac is termed a scale factor can be used to vary the degree of noise reduction. The optimal value for the Sfac parameter has been found to be 1.5 through experimentation however values ranging from 1.0 to 3.0 can also produce acceptable results. The calculation of the noise reduced pixel value $q_{mn}$ as the division of the two sums is then calculated. The process is completed for some or all of the pixels contained in the digital image channel and for some or all the digital image channels contained in the digital image. The noise reduced pixel values constitute the noise reduced digital image. The modified implementation of the Sigma filter is an example of a noise reduction filter that uses a noise characteristic table and is therefore an adaptive noise reduction filter which varies the amount of noise removed as a function of the pixel color and numerical value.

Referring to FIG. 2, the preferred embodiment of the present invention employs a spatial sharpening module 23 as part of the image processing method to produce an enhanced digital image 102. As such, the noise reduced digital image and the local noise characteristic table 105 are received by the spatial sharpening module 23 which produces on output an enhanced digital image 102.

Although the present invention can be used with any spatial sharpening filter which utilizes a priori knowledge of the noise characteristics, the preferred embodiment uses a modified implementation of the method described by Kwon et al in commonly-assigned U.S. Pat. No. 5,081,692. This spatial sharpening method performs an unsharp masking operation by filtering the input digital image with a spatial averaging 2-dimensional Gaussian filter (characterized by a standard deviation of 2.0 pixels) which results in a blurred digital image. The blurred digital image is subtracted from the input digital image to form a high-pass residual. In the method disclosed by Kwon et al. a local variance about a pixel of interest is calculated by using the pixel data from the high-pass residual. Based on the value of the local variance a sharpening factor is adjusted so as to amplify large signals more than small amplitude signals. The amplification factor $\phi$ is therefore a factor of the local variance v. i.e. $\phi(v)$.

The present invention modifies the method taught by Kwon et al. to make the amplification factor $\phi(v)$ a function of the estimated noise, i.e. $\phi(v, \sigma_n)$. The amplification function f is given by a gamma function, or integral of a Gaussian probability function, as given by equation (13).

$$\phi(v) = \frac{y_o + y_{max} \sum e^{-(v-v_o)^2/2s^2}}{y_o + y_{max} \sum e^{-(v_{max}-v_o)^2/2s^2}} \tag{13}$$

where $y_o$ represents a minimum amplification factor $y_{max}$ represents a maximum amplification factor, $v_{max}$ represents a maximum abscissa value of the variable v, $v_o$ represents a transition parameter and s represents a transition rate parameter. The variable $v_o$ is a function of the noise standard deviation value $\sigma_n$ as per equation (14)

$$v_o = Sfac_2 \sigma_n(p_{mn}) \tag{14}$$

where the scaling factor $Sfac_2$ determines the sensitivity of the sharpening sensitivity to the noise and the noise standard deviation value $\sigma_n$ is as described above in equations (6) and (11). The optimal values for the variables used in equation (14) depend on the digital imaging application. The present invention uses a value of 1.0 for $y_o$ which results in no spatial sharpening for noisy regions. A value of 3.0 is used for $y_{max}$, however, this variable is sensitive to user preference with values ranging from 2.0 to 4.0 producing acceptable results. The value of Sfac$_2$ should be set to between 1.0 and 2.0 with 1.5 as optimal. The variables should be set to values in the range from v$_o$/2 to v$_o$/10 for reasonable results. The variable v$_{max}$ should be set to a value much larger than the expected noise, e.g. 20 time the value of σ$_n$.

While the preferred embodiment of the present invention calculates a noise characteristic table and then subsequently uses the noise characteristic table to produce an enhanced digital image, some digital imaging systems can be configured to separate the calculation phase from the enhancement phase. In an alternative embodiment of the present invention, the calculated noise characteristic table is stored with the source digital image 101 as meta-data, i.e. non-pixel information. The source digital image 101 with meta-data can be transmitted to a remote site or stored for safe keeping to be used at a later time or another site. Any of the above mentioned noise characteristic tables can be stored as meta-data. In general a noise characteristic table requires much less memory storage than a set of residual histograms. However, a set of residual histograms can be stored with the source digital image 101 as meta-data.

The present invention uses a spatial filter to calculate a residual digital image 107 form a source digital image 101 and derives noise characteristic values from the residual digital image 107. Those skilled in the art will recognize that the present invention can be used in conjunction with spatial masking techniques, such as the method described by Snyder et al. in commonly-assigned U.S. Pat. No. 5,923,775, to improve the statistical accuracy of the method.

The four direction spatial filter described above can be used as a noise reduction filter. In this embodiment of the present invention, the final noise free pixel estimates are calculated for each pixel in the source digital image 101. The final noise free pixel estimates therefore forms a noise reduced digital image, i.e. a representation of the source digital image 101 with noise removed. An advantage of the present invention over other noise reduction method is the fact that the present invention does not require a priori knowledge of the noise characteristics of the source digital image 101.

The invention has been described in detail with particular reference to certain preferred embodiments thereof, but it will be understood that variations and modifications can be effected within the spirit and scope of the invention.

PARTS LIST 10a image capture device
10b image capture device
10c image capture device
20 digital image processor
22 noise reduction module
23 spatial sharpening module
30a image output device
30b image output device
40 general control computer
50 monitor device
60 input control device
70 offline memory device
101 source digital image
102 enhanced digital image
105 local noise characteristic table
107 residual digital image
110 noise estimation module
120 residual transform module
130 residual statistic accumulator
140 noise table calculator

What is claimed is:

1. A method of spatially filtering a digital image comprising the steps of:
   a) receiving a source digital image including pixels corresponding to one or more different colors;
   b) selecting a pixel of interest in the source digital image;
   c) calculating two or more noise free pixel estimates for the pixel of interest using pixel values sampled in a local region about the pixel of interest;
   d) selecting a final noise free pixel estimate for the pixel of interest by choosing only the noise free pixel estimate closest in value to the value of the pixel of interest; and
   e) repeating steps b) through e) for other pixels in the source digital image to provide a spatially filtered digital image.

2. The method of claim 1 where, in step c), each noise free pixel estimate is independent from the value of the pixel of interest.

3. The method of claim 2 wherein step d) further includes subtracting the final noise free pixel estimate from the value of the pixel of interest to form a residual pixel value; and further including f) using the residual pixel values to estimate a noise characteristic value relating to the noise content of the source digital image.

4. A method of calculating a noise residual digital image from a source digital image, comprising the steps of:
   a) receiving a source digital image including pixels corresponding to one or more different colors;
   b) selecting a pixel of interest;
   c) calculating two or more noise free pixel estimates for the pixel of interest using pixels sampled in a local region about the pixel of interest;
   d) selecting a final noise free pixel estimate for the pixel of interest by choosing only the noise free pixel estimate closest in value to the value of the pixel of interest;
   e) calculating a noise residual pixel value by calculating the difference between the value of the pixel of interest and the value of the final noise free pixel estimate; and
   f) repeating steps b) through e) for other pixels in the source digital image to produce a noise residual digital image.

5. The method of claim 4 where, in step c), each noise free pixel estimate is independent from the value of the pixel of interest.

6. The method of claim 4 where one of the noise free pixel estimates is calculated as a linear combination of the values of pixels sampled about the pixel of interest along a line centered in the local region about the pixel of interest.

7. The method of claim 6 wherein the linear combination of the values of pixels sampled about the pixel of interest are in accordance with a cubic relationship.

8. The method of claim 4 wherein only two pixels sampled in the local region about the pixel of interest are used to calculate a noise free pixel estimate.

9. A method of calculating a noise characteristic value from a source digital image, comprising the steps of:
   a) receiving a source digital image including pixels corresponding to one or more different colors;
   b) selecting a pixel of interest;
   c) calculating two or more noise free pixel estimates for the pixel of interest using pixels sampled in the local region about the pixel of interest;
   d) selecting a final noise free pixel estimate for the pixel of interest by choosing only the noise free pixel estimate closest in value to the value of the pixel of interest;

e) calculating a noise residual pixel value by calculating the difference between the value of the pixel of interest and the value of the final noise free pixel estimate;

f) repeating steps b) through e) for other pixels in the source digital image thereby forming a residual digital image from the noise residual pixel values; and g) using the noise residual pixel values to calculate a noise characteristic value.

10. The method of claim 9 wherein step g) includes calculating the noise characteristic value as a function of the numerical values of the source digital image pixels.

11. The method of claim 9 wherein step g) includes calculating the noise characteristic value as a function of color and the numerical values of the source digital image pixels.

12. The method of claim 9 wherein step g) includes calculating the noise characteristic value as a function of the standard deviation of the noise residual pixel values.

13. The method of claim 9 wherein the source digital image includes two or more digital image channels and further including step h) calculating a residual pixel value for the two or more digital image pixels and i) includes using the residual pixel values for the two or more digital image pixels to calculate a color weighting factor; and using the color weighting factor to exclude residual pixel values from the calculation of the noise characteristic value.

14. The method of claim 9 wherein step d) further includes selecting the final noise free pixel estimate for the pixel of interest by choosing only the noise free pixel estimate closest in value to the value of the pixel of interest.

15. The method of claim 9 where one of the noise free pixel estimates are calculated as linear combination of the values of pixels sampled about the pixel of interest along line centered in the local region about the pixel of interest.

16. The method of claim 15 wherein the linear combination of the values of pixels sampled in the local region about the pixel of interest are in accordance with a cubic relationship.

17. The method of claim 15 wherein the only two pixels sampled about the pixel of interest are used to calculate a noise free pixel estimate.

18. A method of enhancing a digital image comprising the steps of:

h) using the method of claim 9 to calculate a noise characteristic value; and i) using the noise characteristic value and the source digital image to generate an enhanced digital image.

19. The method of claim 18 wherein step i) further includes using the noise characteristic value to remove noise from the source digital image to produce the enhanced digital image.

20. The method of claim 18 wherein step i) further includes using the noise characteristic value to sharpen the source digital image to produce the enhanced digital image.

* * * * *